United States Patent [19]
Huai et al.

[11] Patent Number: 5,673,381
[45] Date of Patent: Sep. 30, 1997

[54] SYSTEM AND PARALLEL STREAMING AND DATA STRIPPING TO BACK-UP A NETWORK

[75] Inventors: ReiJane Huai, Old Brookville; Robert Daly, Ronkonkoma; Walter Curti, Dix Hills; Deepak Mohan, Huntington; James Kuang-Ru Chueh, Bayside; Larry Louie, Forest Hills, all of N.Y.

[73] Assignee: Cheyenne Software International Sales Corp., Roslyn Heights, N.Y.

[21] Appl. No.: 591,120

[22] Filed: Jan. 25, 1996

Related U.S. Application Data

[63] Continuation of Ser. No. 250,077, May 27, 1994, abandoned.

[51] Int. Cl.⁶ .................................................. G06F 11/34
[52] U.S. Cl. .................................. 395/180; 395/489
[58] Field of Search .......................... 395/180, 181, 395/182.04, 489, 620, 650; 364/238.4, 238.6, 239.6, 242.94, 242.95, 284.1, 284.4, 285.1; 371/8.1, 10.2

[56] References Cited

U.S. PATENT DOCUMENTS

| | | | |
|---|---|---|---|
| 4,744,097 | 5/1988 | Haruhara . | |
| 4,751,648 | 6/1988 | Sears, III et al. . | |
| 4,757,267 | 7/1988 | Riskin . | |
| 4,820,354 | 4/1989 | Minor .................................... | 358/296 |

(List continued on next page.)

OTHER PUBLICATIONS

"ProServe CX™ NLM Backup for NetWare®", Sytron®, (Mar. 3, 1994?).

"Building a TLI Application with the NetWare® Client SDK", *Bullets*, Novelle Professional Developer, Aug. 1993, vol. 5, No. 8, pp. 1–6.

"ProServe CX—Device Support List", Mar. 17, 1994.

"Competitive Analysis—ProServe CX™", Rexon/Sytron, Inc., Mar. 03, 1994, pp. 1–5.

(List continued on next page.)

*Primary Examiner*—Robert W. Beausoliel, Jr.
*Assistant Examiner*—Albert Décady
*Attorney, Agent, or Firm*—Kenyon & Kenyon

[57] ABSTRACT

A method and system for parallel back-up of a plurality of client computers on a network, in particular, a local area network or wide area network. Each client computer has a local storage device that stores files. A number of back-up storage devices are organized into groups, with each back-up storage devices being a member of one group. A server computer is coupled to the plurality of back-up storage devices by a bus and is also coupled to the network. The server computer for executing a back-up job. The server computer accepts parameters for the back-up job, the parameters including a source parameter specifying a set of the client computers and a destination parameter specifying a group. The server computer receives files from each one of the set of client computers specified in the source parameter in parallel. Each received file is stored on one of the back-up storage devices being a member of the group specified in the destination parameter. When that back-up storage device is full or can not receive files, the file back-up process cascades to the next storage device in the group. Files can be transferred to storage devices in different groups in parallel.

81 Claims, 6 Drawing Sheets

U.S. PATENT DOCUMENTS

| | | | |
|---|---|---|---|
| 5,133,065 | 7/1992 | Cheffetz et al. | |
| 5,144,551 | 9/1992 | Cepulis. | |
| 5,163,131 | 11/1992 | Row et al. | |
| 5,170,466 | 12/1992 | Rogan et al. | |
| 5,185,693 | 2/1993 | Loftis et al. | |
| 5,187,750 | 2/1993 | Behera. | |
| 5,204,954 | 4/1993 | Hammer et al. | |
| 5,212,772 | 5/1993 | Masters. | |
| 5,218,695 | 6/1993 | Noveck et al. | |
| 5,226,157 | 7/1993 | Nakano et al. | |
| 5,237,661 | 8/1993 | Kawamura et al. | |
| 5,247,670 | 9/1993 | Matsunaga. | |
| 5,276,860 | 1/1994 | Fortier et al. | |
| 5,301,320 | 4/1994 | McAtee et al. | 364/200 |
| 5,325,310 | 6/1994 | Johnson et al. | 364/514 |
| 5,355,453 | 10/1994 | Row et al. | 395/200 |
| 5,367,698 | 11/1994 | Webber et al. | 364/200 |
| 5,379,374 | 1/1995 | Ishizaki et al. | 395/200 |
| 5,386,545 | 1/1995 | Gobmos, Jr. et al. | 395/575 |
| 5,394,526 | 2/1995 | Crouse et al. | 395/200 |
| 5,504,888 | 4/1996 | Iwamoto | 395/600 |

OTHER PUBLICATIONS

"ProServe CX$_{TM}$—NLM Backup for NetWare$_®$", Syntron Corporation.

ProServe CX, NLM Backup For NetWare Installation Guide, First Edition (Jan. 1994), Sytron Corporation.

Legato NetWorker User's Guide NetWare Version, Oct. 1993, Legato Systems, Inc.

ProServe CX, NLM Backup For NetWare, Administrator's Guide, First Edition (Jan. 1994), Sytron Corporation.

Legato Networker Administrator's Guide, NetWare Version, Oct. 1993, Legato Systems, Inc.

SYSTEM AND PARALLEL STREAMING AND DATA STRIPPING TO BACK-UP A NETWORK

This application is a continuation of application Ser. No. 08/250,077, filed on May 27, 1994, now abandoned.

FIELD OF THE INVENTION

The present invention is directed to a system and method for backing-up a computer system, and more particularly, a system and method for performing parallel streaming and data striping when backing up a local area network, wide area network or enterprise wide network.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

Local area networks (or LANs) typically comprise a number of client computers and servers coupled together in a network according to a client/server architecture.

Usually, the client computers are personal computers or workstations with their own processing capability and a hard disk drive or other local storage device. Servers provide services to clients, including, for example, back-up services.

Often, a user of the LAN (typically a network manager) wishes to back-up data stored on the hard drive(s) of some or all of the computers on the LAN. In the back-up process, the files stored on clients and servers of the LAN are down-loaded onto a central storage device, such as a tape on a tape drive. Thus, for example, if a file is damaged on a client computer, the network manager can retrieve the back-up copy of the lost data from the central back-up storage device.

As used herein, the term LAN includes a wide area network ("WAN") and an enterprise wide network.

Typically, more than one back-up storage device is used when backing-up a LAN. For example, there may be four tape drives used for central back-up storage. In existing systems, as one tape drive becomes full, the next tape drive is used as the back-up storage device. This is called cascading. However, difficulties arise when more drives have to be added to the network at a later date. Cascading between drives of differing models and/or brands is difficult and sometimes impossible. Thus, the network manager is often constrained in choice of which type or brand of drive can be added to the network at a later date.

More advanced systems allow for the parallel back-up of client computers. For example, if the tape drives used for back-up storage are coupled to the server computer using a bus operating according to the SCSI protocol, then up to seven clients can be backed-up "simultaneously" to seven different tape drives. However, when one of the tape drives becomes full, the back-up process for the corresponding client must be suspended until another tape drive becomes available. When another tape drive does become available, the back-up process for the suspended client continues on this tape drive. It should be noted that although communication between the server and the tape drives is in parallel, the clients and the server communicate serially in the back-up process. Thus, in performing a parallel back-up via the server, only one client at a time provides the data to be backed-up to the server.

It was therefore usual to back-up one client at a time or to back-up a number of clients concurrently where each client is backed-up to a single specified drive. For concurrent back-up, a bottleneck occurs when reading files from the clients and transferring them to the server.

In some systems, data being backed up was often buffered when read from a client and before being provided to a tape drive. For example, if ClientA was being backed-up to DriveA, data would be read from ClientA and placed in a buffer on the server. Once the buffer was full, the data in the buffer would be provided to DriveA. It is noted that in such a system the segment written to the tape relates to buffer size, not to the logical division of files as stored on the client.

A system by Gigatrend Incorporated, of Carlsbad, California, and a system called Networker by Legato implement concurrent back-up via striping at the data block level. Although this approach simplifies the back-up procedure, it complicates the restore and compromises reliability. For example, one bad spot on a tape may break continuity and prevent the rest of a session from being restored.

Thus, there exists need for a system that allows concurrent back-up at a file level of clients and file servers on a LAN. Further, there exists a need for a system that can perform parallel back-up to a plurality of storage devices, such as tape drives, and that allows for cascading between storage devices.

SUMMARY OF THE INVENTION

The present invention is directed to a method and system to back-up a LAN. The present invention enables a number of clients and file servers on the LAN to be backed-up in parallel at the file level.

According to a representative embodiment of the present invention, a plurality of clients (and file servers) can each "push" files in parallel to respective buffers at a server. When a complete file is placed in a buffer at the server, the server causes the file to be written to a back-up storage device. Typically, the buffer size is large enough to hold at least a file of average size. The system of the present invention includes a plurality of back-up storage devices operating concurrently. The files in the buffers are transferred in parallel to the concurrently operating back-up storage devices.

The present invention organizes back-up storage devices into groups. Each group may contain one or more back-up storage device. In a back-up job, each client or file server being backed-up is assigned to one of the groups. Each group has an active back-up storage device. Thus, back-up storage device in each group can be operating concurrently with storage devices from other groups.

Accordingly, the present invention can perform "parallel streaming" in the back-up process—clients (or sets of clients) each can be assigned to different groups of back-up storage devices, allowing data to be written to the back-up storage devices in parallel.

Thus, in combination, the above features of the present invention enable multiple clients to be backed-up at the file level in parallel.

Further, the present invention enables cascading between devices of a group.

In more detail, the representative embodiment of the present invention includes a server and a number of clients (such as, for example, workstations, Macintosh brand and I/NIX brand computers, and remote file servers). The server and clients are organized in a local area network.

The server is coupled to one or more buses. Each bus is coupled to one or more back-up storage devices. The storage devices in the representative embodiment are tape drives.

In the representative embodiment, the storage devices on each bus can be organized into groups.

A user will define one or more back-up jobs by specifying the clients that are to be backed-up ("SOURCES") and the group of storage devices that will store the files being backed-up ("DESTINATION").

Each client includes an agent. When a back-up job runs, the agents of the specified sources are each activated. The activated agents run on each SOURCE in parallel. Each agent transfers, in parallel, the data to be backed-up to the server. Thus, unlike other systems, it is the clients that "push" data to be backed-up to the server, rather than the server "pulling" the data from the clients.

In particular, the server includes a plurality of buffers (or, alternatively, one buffer divided into a plurality of segments.) Each agent at a SOURCE is allocated a buffer. Thus, the agents transfer, in parallel, the data to be backed-up to the respective buffers.

Buffers or buffer space can be allocated "on the fly", depending upon, for example, the average size of the files being backed-up and the number of backup jobs running concurrently.

The server waits until a complete file has been placed in a buffer by an agent. When a buffer has a complete file, the server starts the process to transfer the file in the buffer to its DESTINATION. The server moves onto the next buffer, if necessary waits until a complete file has been placed in the buffer, and then starts the process to transfer the file in that buffer to its DESTINATION. This continues until all files are backed-up.

Thus, unlike prior systems, the divisions of the tape at a DESTINATION are not the size of the buffer but the size of each file.

Accordingly, to preserve data integrity and reliability, the present invention in one embodiment establishes multiple pipelines to receive and assemble files from several sources simultaneously and stream them to the selected DESTINATIONS one file at a time.

The steps performed by the server of the representative embodiment can be summarized as follows:
1. Select first buffer.
2. Wait until complete file in buffer.
3. Start process to transfer file to DESTINATION.
4. Move to next buffer.
5. If not complete file in buffer, wait.
6. When complete file in buffer, transfer file to DESTINATION.
7. Repeat steps 4 to 7 until all files transferred.

In the representative embodiment of the present invention, if a file is larger than the buffer space, the above method is modified. The part of the file that fills the buffer is transferred to a DESTINATION. The server does not move to the next buffer, but waits until the remainder of the file fills that same buffer, then transfers the remainder to the DESTINATION and moves to the next buffer. However, optimally, it is best if the buffer size is at least the average file size.

The present invention can also operate in series mode if a SOURCE does not have an agent. In such a case, those SOURCES with agents are processed first, in parallel as described above, then the remaining SOURCES (those without agents) are processed sequentially.

As stated above, the storage devices are organized into groups. Each group can have one or more storage devices. The user specifies the group as the DESTINATION. When a file is transferred to a specified DESTINATION, a first storage device is selected to receive files. When that storage device is full, the files are stored on a next storage device in the group, and so on through the storage devices in the group. This "cascading" between storage devices continues until all storage devices in the group are filled.

Further, whether or not the "cascading" feature is utilized, the use of groups enables multiple tape drives to operate in parallel. According to the representative embodiment of the present invention, one tape drive from each group can be receiving and writing data simultaneously and in parallel. Thus, once a complete file has been placed in a buffer, that file can be immediately written to its destination tape drive. Accordingly, files can be transferred from the buffers to the tape drives in parallel.

In the representative embodiment, the bus coupling the storage devices to the server operates according to the SCSI protocol. SCSI ("Small Computer System Interface") is an industry standard high speed parallel interface typically used for connecting microcomputers to peripheral devices, and to other computers and local area networks. Up to seven devices, not including the computer (i.e., the server) can be attached through a single SCSI port. Each device has an address (or ID) which is also its priority number. Only one device at a time can transmit through the port, and priority is given to the device with the highest address. The present invention allows more than one back-up job to be running at the same time. In the representative embodiment, the user can have up to seven back-up jobs running at the same time. When using the SCSI (or other similar or more advanced interface protocols), the back-up jobs all have, via SCSI, the ability to simultaneously communicate with the back-up storage devices. Further, each of the back-up jobs can back-up clients with agents. These features in combination allow simultaneous back-up of many clients in parallel at the file level.

DETAILED DESCRIPTION

Figure 1:
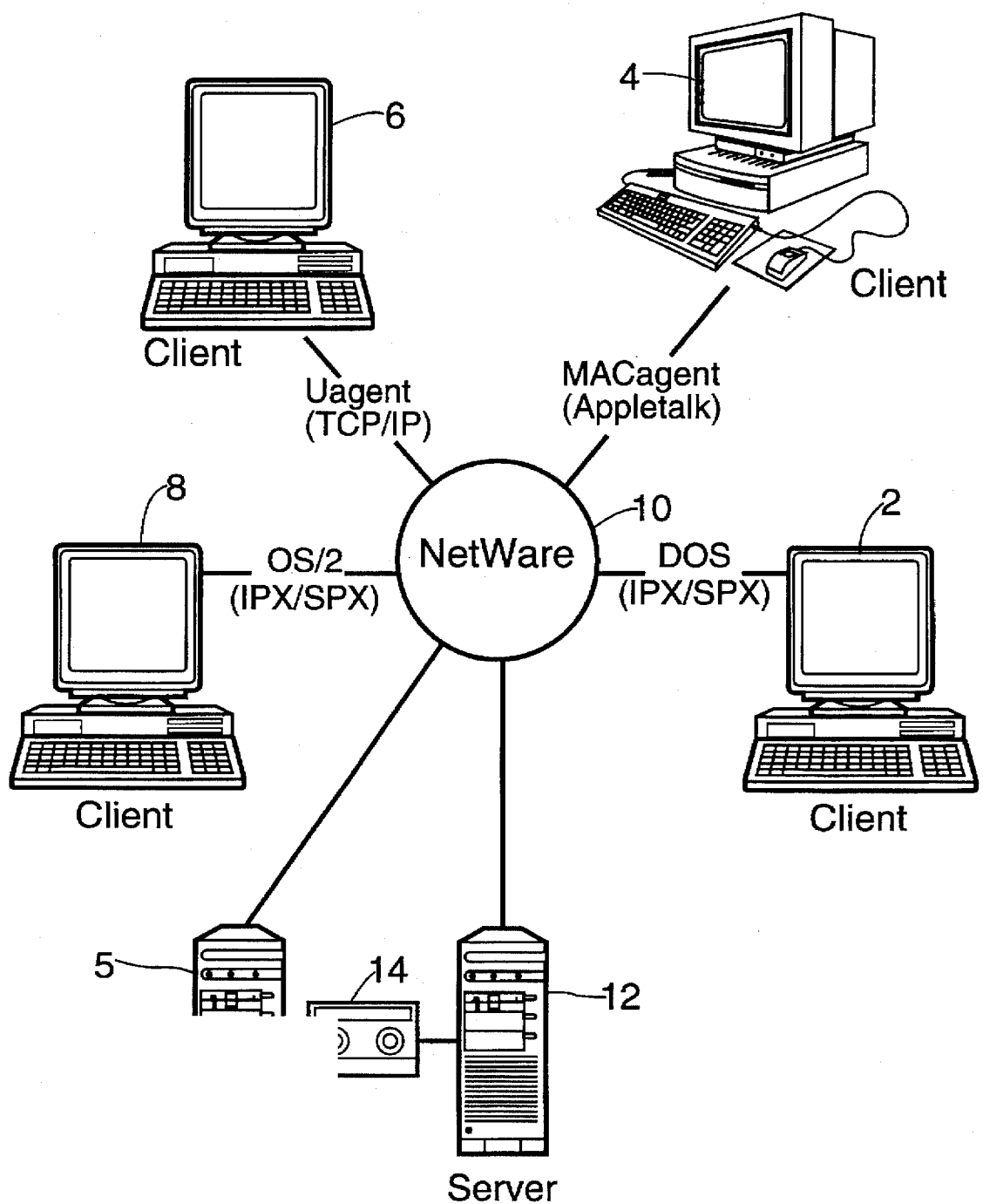
FIG. 1 is a block diagram of a typical LAN that can be backed-up according to the present invention.

Referring now to the drawings, and initially FIG. 1, there is illustrated a typical LAN that can be backed-up according to the present invention. The LAN in FIG. 1 has four client computers 2, 4, 6 and 8, and a file server computer 5. The client computers and file server computer 5 are coupled together in a network 10, and are also coupled to a server computer 12. The server computer 12 is coupled to a back-up storage system 14, for example, a series of tape drives coupled to a bus.

The four clients 2, 4, 6, 8 are typically workstations or personal computers. As shown in FIG. 1, client 2 is an IBM compatible computer with a DOS operating system running Microsoft Corporation's Windows program. Client 4 is Apple Computer, Inc.'s Macintosh brand computer running System 7 operating system. Client 6 is a computer running the Unix operating system. Client 8 is a computer running the OS/2 brand operating system.

In the representative embodiment, the server 12 is a computer with an INTEL brand processor operating Novell, Inc.'s Netware brand server software.

Client 2 and client 8 communicate with the server 12 according to the IPX/SPX protocol. Client 4 communicates with the server 12 according to the Appletalk protocol. Client 6 communicates with the server 12 according to the TCP/IP protocol.

Thus, the present invention utilizes a client/server architecture that can accommodate various brand client workstations and computers. FIG. 1 is an example of a typical network structure only, and does not limit the type of units that can be backed-up according to the principles of the present invention. For example, as explained in detail below, the present invention can back-up many file servers and also remote file servers. Further, the representative embodiment is explained using tape drives as the back-up storage devices, but in other embodiments, non-tape high speed storage devices can be used.

In the representative embodiment, server 12 comprises three functional modules, namely, a job processing module, a database module and a tape server module. These modules in turn comprise or have access to various Netware Loadable Modules (or "NLMs"), as explained below.

The job processing module of the server 12 processes jobs that a user, such as a network manager, schedules to run at the server 12. The server 12 uses standard Netware queue services to manage back-up jobs, similar to the operation of print queue under Netware. When a job is ready to be run, the job processing module takes the job and runs it with the help of some dynamically loaded (or "spawned") NLMs.

In the representative embodiment, the database module uses Netware Btrieve V6.10c to keep track of files and directories that have been backed up and copied by the server 12; information such as job type, status, start time and time for each job the server 12 has processed; information such as tape name, format date, and expiration date for each tape that has been used for back-ups; and information such as node address, node name, and log-in name for each processor 2–8 on the network 10.

Information is written to database files by various NLMs depending on the type of job the server is performing. For example, for back-up jobs, a FSTAPE NLM is responsible for writing information about files and directories that are processed to the database. A TAPESVR NLM is responsible for writing information about tapes, tape devices (e.g. 14) and any errors that occurred during an operation to the database. A CLIENTS NLM runs in the background and is the "client tracker," responsible for collecting and updating information about workstations 2–8 on the network 10.

The tape server module is the link between the server 12 and the tape drives 14. This module "knows" how to communicate with the hardware on the network 10. In one embodiment of the present invention, there are three primary NLMs associated with the tape server module, namely TAPESVR, STANDARD, and TAPEBD. TAPESVR is responsible for establishing the initial connection with whoever is making the request for a connection. There is one STANDARD NLM for each tape group attached to the server 12, as explained below. After a connection is made, TAPESVR communicates with the appropriate STANDARD NLM based on the tape group requested for the job. TAPEBD exists on the host file server 12 with the name of the host adapter card chosen on installation.

Figure 2:
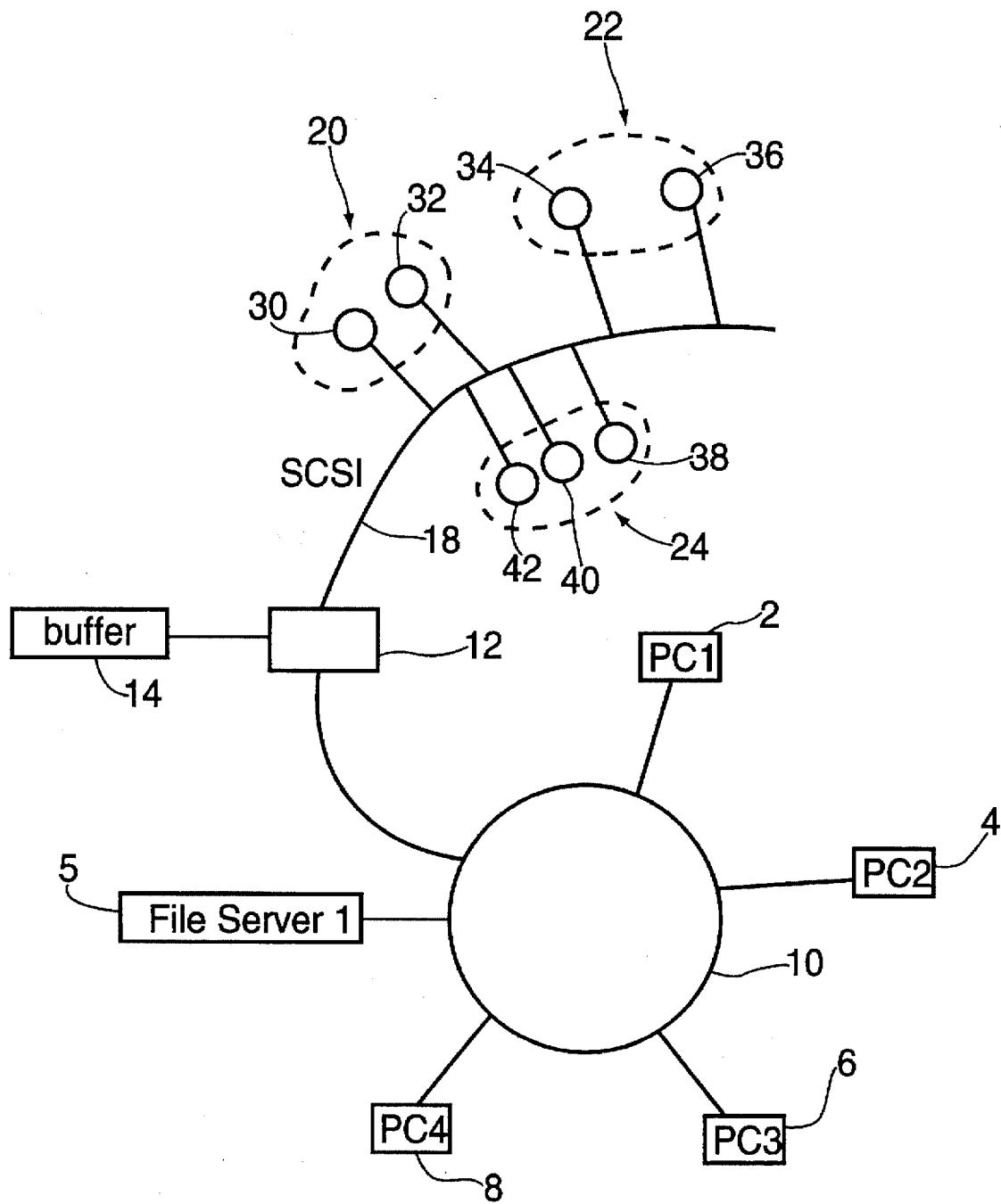
FIG. 2 is a detailed block diagram of the system of a representative embodiment of the present invention.

Turning now to FIG. 2, there is illustrated in more detail the network 10 of FIG. 1. Coupled to the server 12 are seven tape drives 30–42. The tape drives 30–42 are coupled to the server 12 via a bus 16 operating according to the SCSI protocol. Each tape drive is allocated to a group. In FIG. 2, tape drives 30 and 32 are in group A (reference number 20). Tape drives 34 and 36 are in group B (reference number 22). Tape drives 38–42 are in group C (reference number 24). Typically, each tape drive in a group is of the same brand and model, but tape drives in different groups can be of differing makes and/or models.

According to SCSI conventions, each tape drive has an ID number so that the server 12 can identify or specify a tape drive. The following table summarizes the above information:

TABLE 1

| SCSI ID | Reference Numeral on FIG. 2 | Group |
|---|---|---|
| 0 | 30 | A |
| 1 | 32 | A |
| 2 | 34 | B |
| 3 | 36 | B |
| 4 | 38 | C |
| 5 | 40 | C |
| 6 | 42 | C |

Table 1 is an example of a the group configuration of FIG. 2, and is not intended to limit the scope and flexibility that a user has in defining groups and in allocating storage devices to groups.

According to the present invention, more than one bus 16 can be coupled to the server 12, thus increasing the number of tape drives which can be used for back-up purposes. The number of tape drives coupled to each bus is limited only by the bus protocol.

In the representative embodiment, there is one STANDARD NLM for group A, one STANDARD NLM for group B and one STANDARD NLM for group C.

The present invention can back-up file servers and processors (e.g. 2–8) on the network 10. In this document, file servers are named FSn and processors are named PCn. Assume, for the purpose of illustration only, the network 10 has four file servers, namely FSA, FSB, FSC and FSD, and four processors, namely PC1, PC2, PC3 and PC4.

In the back-up process, a user specifies what file servers and processors the user wishes to back-up. These are the SOURCE for a back-up job. The user then specifies the tape group (e.g. A, B or C) as the DESTINATION for the back-up, and names the tape group. The user may also specify a time at which the job is to be run. The following are examples of three jobs a user may define when backing-up the network of FIG. 2:

```
Job1

SOURCE
        FSA
        FSB
        PC1
DESTINATION
        Tape Group A
        My_Tape
TIME
        23:30
Job2

SOURCE
        FSC
        FSD
        PC2
DESTINATION
        Tape Group B
        My_Tape_2
TIME
        23:30
Job3

SOURCE
        PC3
        PC4
DESTINATION
        Tape Group C
        My_Tape_3
TIME
        23:45
```

Thus, for example, JOB1 specifies that file server A, file server B and processor 1 be backed-up to tape group A (i.e., 20) at 23:30. The user has named tape group A as "My_Tape".

The server 12 stores jobs in a job queue, as explained above. The job processing module picks up a job from the queue (e.g. JOB1), starts up a file process and causes the correct tape drive to be connected via the tape server module. For example, for JOB1, the tape server module would connect tape drive 30, as it is the first tape drive of Group A. As the SCSI protocol allows "concurrent" connections between tape drive and server 12, jobs with different source groups can be processed simultaneously. Thus, in the above example, JOB1, JOB2 and JOB3 can, if required, all run at the same time as they each specify a different DESTINATION group.

The representative embodiment of the present invention can access information on file servers and processors in two modes, namely, series mode and parallel mode.

In series mode, the server 12 sequentially accesses each source as specified in a job. For example, for JOB1, the Iserver 12 would establish a connection with FSA, back-up FSA, then establish a connection with FSB, back-up FSB, then establish a connection with PC1 and backup PC1.

In parallel mode, each source processor (e.g. FSA, FSB, PC1) has at least one resident agent. Thus, for example, client 2 has a DOS agent and WINagent, client 4 has a MACagent, client 6 has a Uagent and client 8 has a OS/2 agent. A file server has a Netware agent. The file server agent performs the open, read, close and chmod functions of a remote server and pushes a packaged data stream to the server 12.

When a back-up job is processed, the server 12 (or more particularly, a PARALLEL NLM 308, as explained below in reference to FIG. 5) will, on the fly, allocate buffer space in a buffer 14 for each SOURCE in a job. (Alternatively, there could be multiple buffers, and the server 12 will allocate one buffer for each SOURCE.) The server 12 establishes simultaneous connections with each SOURCE. The agent at each SOURCE is instructed to start back-up. Each agent on each SOURCE (e.g., for JOB1, the agent for FSA, the agent for FSB, and the agent for FSC) will simultaneously and in parallel start reading and transferring files to that agent's allocated buffer space. In effect, each agent pushes files to that agent's buffer space.

The server 12 accesses each buffer space in turn. When a complete file is placed in the buffer space by an agent, the server 12 will cause that file to be written to the tape drive of the correct group. The server 12 will then go to the next buffer space. If a complete file has been placed in the buffer space, the server 12 will cause that file to be written to the tape drive of the group. If a complete file has not yet been placed in the buffer space by the agent, the server 12 will wait until a complete file has been written by the agent onto the buffer space. Once a complete file has been written onto the buffer space, the server 12 will cause that file to be written to the tape drive of the group, and then move onto the next buffer space.

Thus, unlike prior systems, the division of the tape of a tape drive is not the size of the buffer but the logical size of each file as located, for example, on a client.

One tape drive from each group can operate at the same time as the tape drives of other groups. Accordingly, files can be read from the buffers of the server 12 and written to nominated tape drives in parallel.

Figure 3A:
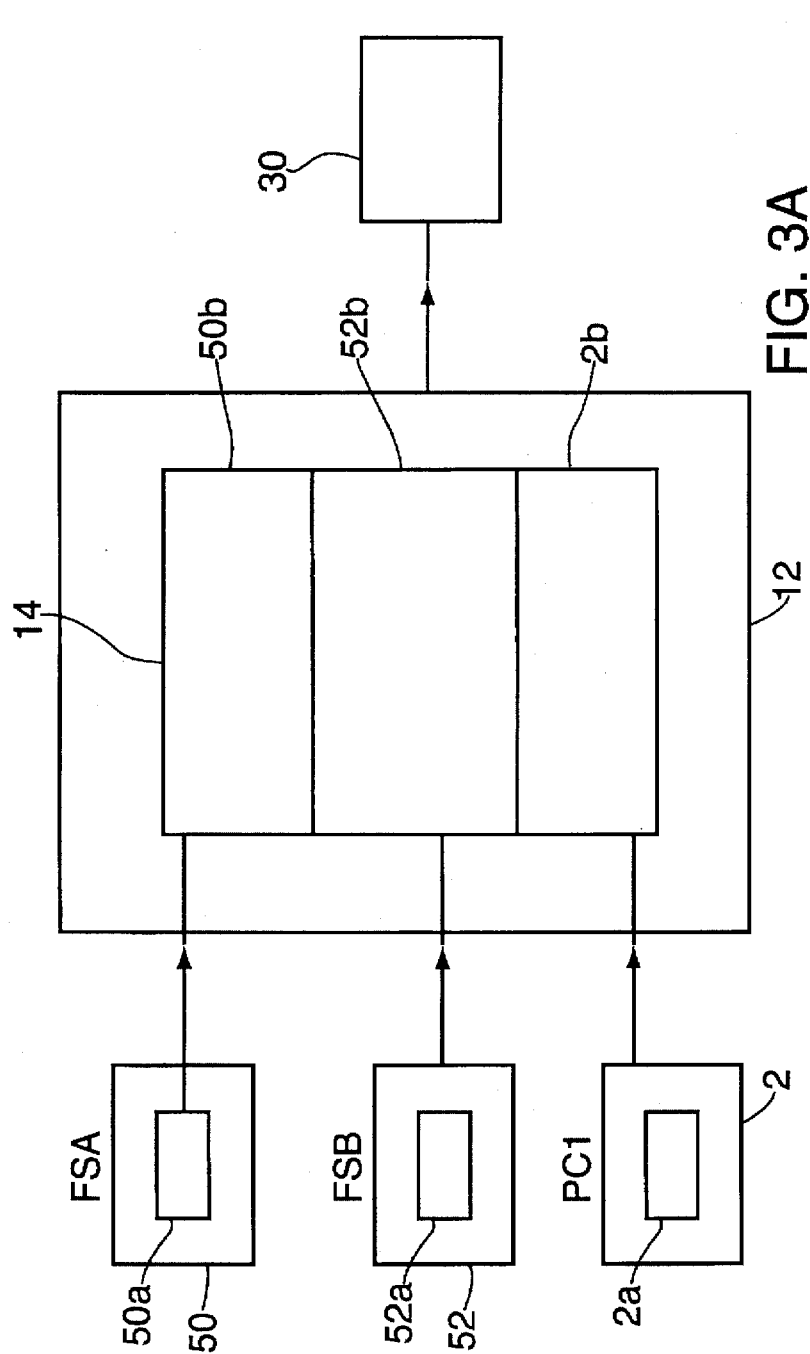
FIG. 3A illustrates in block diagram form the buffer space and agent arrangement of a representative embodiment of the present invention.

FIG. 3A shows in block diagram form the buffer space and agent arrangement for example JOB1 above, when back-up is occurring in parallel mode. The server 12 instructs agents for FSA 50, FSB 52 and PC12 to start back-up. These agents, 50a, 52a and 2a respectively, simultaneously write files to their segments of buffer 14, i.e., segments 50b, 52b, and 2b respectively. When a complete file from FSA 50 is in buffer segment 50b, the server 12 causes it to be written to the correct tape drive, e.g. 30. Then, when a complete file from FSB 52 is in its buffer segment 52b, the server 12 causes the file to be written to tape drive 30. This continues until all files have been backed-up. It is noted that the buffer segments 50b, 52b and 2b are being filled at the same time, unless being read by the server 12.

Figure 3B:
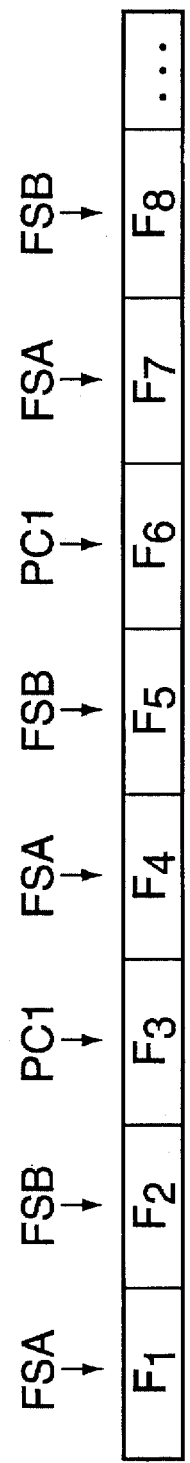
FIG. 3B shows a typical tape segment for a parallel mode back-up.

FIG. 3B shows a typical tape segment for a parallel back-up of JOB1. Eight files are shown on the tape. It can be seen that the segments of the tape are of unequal length, and correspond to the backed-up file size. The source of each file is shown above the tape. (When one source is exhausted, the process continues with the remaining files from the remaining sources.) Thus, the resolution on the tape is that of the file boundary, not buffer size.

Typically, one aims to set a buffer size greater than the average file size. The buffer size can be allocated "on the fly" i.e., depending upon the number of SOURCES for a job. If the buffer fills before an entire file is placed in the buffer, that segment of the file in the buffer is written to tape. Server 12 waits until the rest of the file is placed in the buffer segment and written to tape before moving to the next buffer segment and receiving another file. Thus, server 12 will only move to the next buffer segment when an entire file has been stored on tape.

More than one job can be processed by the server 12 at one time. In the representative embodiment, up to seven back-up jobs can be running concurrently. If all are in parallel mode, then each agent for each SOURCE for each job is simultaneously writing a file to a buffer segment. However, it should be noted that a job will not be processed if its DESTINATION is the same as an active job's DESTINATION; only one job at a time can write to a tape group. (Accordingly, the system manager should allocate different jobs to different tape groups if the concurrent features of the present invention are to be used in the most optimal fashion.)

Accordingly, to preserve data integrity and reliability, the present invention establishes multiple pipelines to receive and assemble files from several sources simultaneously and stream them to tape one file at a time. Each device (or server volume) has its own session number. The files from different SOURCES are mixed on tape, but belong to a different session.

The present invention can perform cascading between storage devices of the same group. When backing-up to a tape group, when a tape drive in the group become full, the next tape drive in the group is used for the back-up. Thus, there is cascading between the tape drives of a group. For example, if Group C is selected as the SOURCE, then tape drive 38 will be used first. When full, tape drive 40 will be used, and when it is full, tape drive 42 will be used.

In alternative embodiments, the parallel striping feature of the present invention can be used without the cascading and group features.

Figure 4:
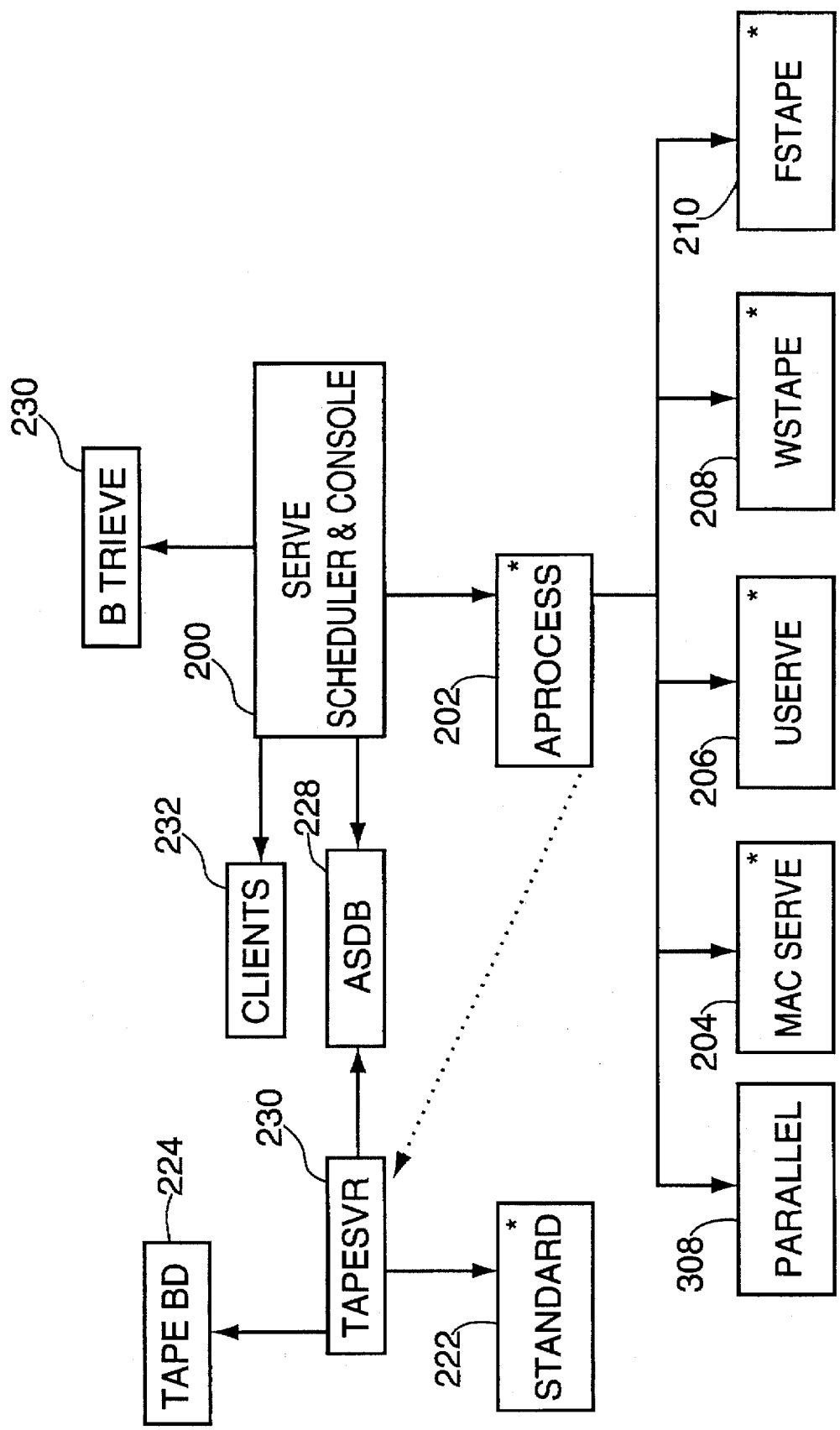
FIG. 4 is a diagram of the Network Loadable Modules ("NLMs") used according to the representative embodiment of the present invention.

FIG. 4 shows a detailed diagram of the NLMs used according to the representative embodiment of the present invention. NLMs marked with a "*" are spawned when needed, the others not marked are permanently loaded in the server 12.

SERVE 200 is the NLM that controls the job processor functions, for example, scanning job queues etc., as described above. If a back-up (or restore) job is processed, SERVE 200 spawns an APROCESS 202. APROCESS 202 is an NLM that coordinates the backup process. For each type of SOURCE being backed-up, APROCESS 202 spawns corresponding back-up modules, i.e., 204–210. MACSERVE 204 is a NLM for a Macintosh SOURCE. USEEVE 206 is a NLM for a Unix SOURCE. WSTAPE 208 is a NLM for a DOS SOURCE. FSTAPE 210 is a NLM for a file server SOURCE.

As explained above, each tape drive group has a corresponding STANDARD NLM 222. TAPEBD 224 is a board driver. STANDARD 222 and TAPEBD 224 communicate with TAPESVR 220, the tape server manager NLM. The TAPESVR 220 takes requests and makes sure that each request is "given" to the correct STANDARD NLM.

ASDB 228 is a database NLM responsible for building tables during back-up to keep track of where files are stored. CLIENTS 232 and BTRIEVE 230 were explained above. PARALLEL NLM 308 is used in parallel mode, and is explained in detail at FIG. 5.

Figure 5:
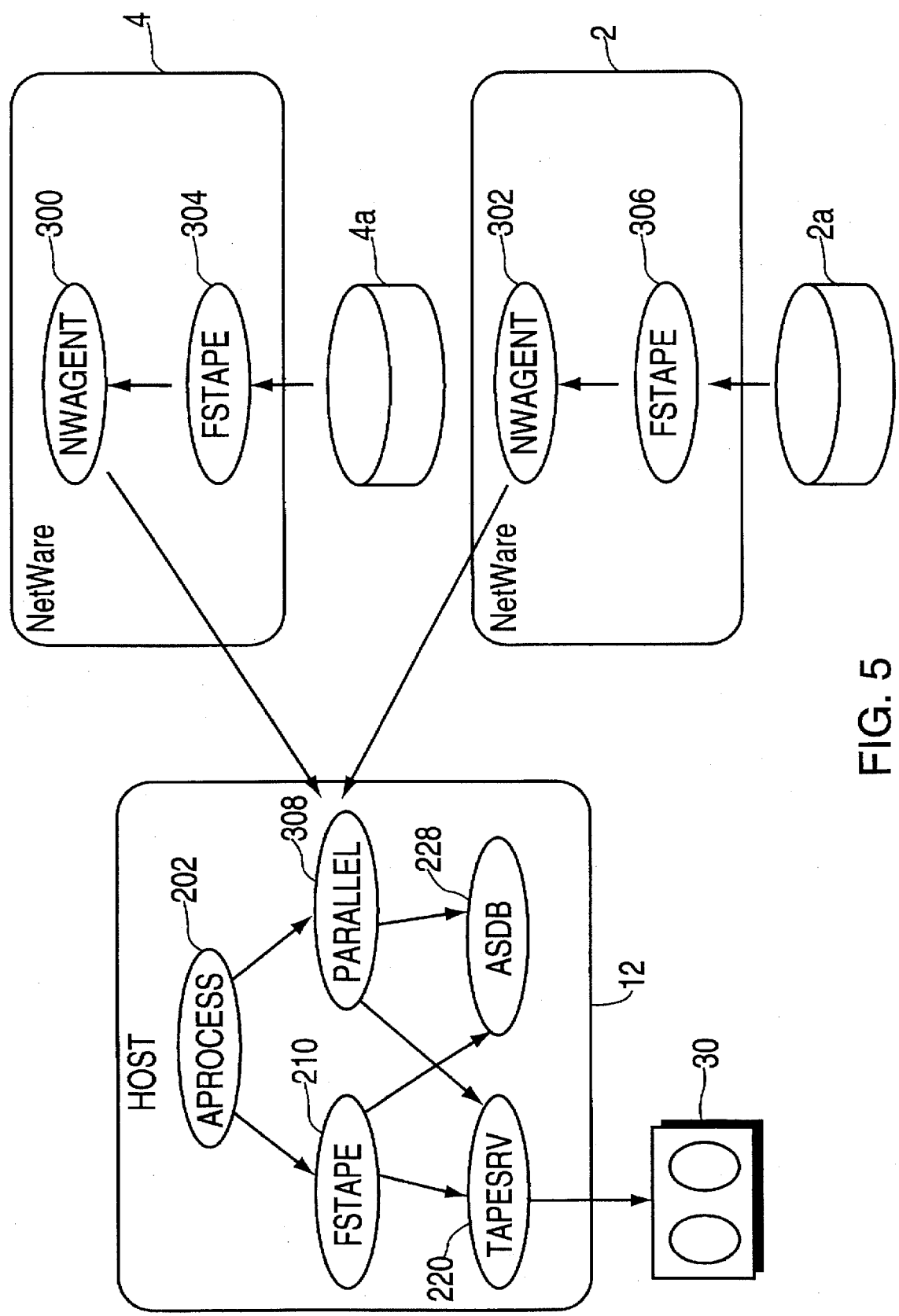
FIG. 5 is a diagram of the NLMs used according to the representative embodiment of the present invention in parallel mode.

Turning now to FIG. 5, there is illustrated in block diagram form a representation of the NLMs used parallel mode. When in parallel mode, an agent 300, 302 is spawned on each client, e.g. 2 and 4. For example, for client 2, agent 302 is spawned. Agent 302 accesses a FSTAPE NLM 306 that retrieves files of data from the client's disk drive 2a. As shown in FIG. 5, there are two agents 300 and 302, operating in parallel. Each agent writes the files of data to server 12, in particular, to buffer space allocated to the agent. (Thus, for FIG. 5, there are two buffer spaces.)

At the host (i.e., the server 12), PARALLEL NLM 308 coordinates the reading of the buffer spaces. When a complete file has been written to the buffer space, as explained above, PARALLEL NLM 308 writes database information via ASDB 228, and accesses the TAPESRV NLM 220 to write a file to tape (e.g., 30).

In short, PARALLEL NLM 308 is loaded by APROCESS 202 to back-up SOURCES with agents loaded. The agents (e.g. 300 and 302) are responsible for scanning the data set based on the job definition and transferring data to PARALLEL NLM 308. The agents spawn FSTAPE (e.g. 304 and 306) and get data from FSTAPE.

If non-parallel back-ups are used, the APROCESS 202 and FSTAPE 210 NLM operate in the usual way, explained above. In one job, the server 12 can back-up all SOURCES with agents concurrently, and then back-up other SOURCES without agents one after the other.

The following table sets out the communication protocol between PARALLEL NLM 308 and an agent (e.g. 300).

TABLE 2

| PARALLEL | AGENT |
|---|---|
| Connect to each SOURCE | |
| | Send Request OK (or error code) command with the following information: 1. volume names (if requested) 2. Any extra session (Database) 3. NDS available |
| Transmit job request (statistic block) Scan the channels in round-robin fashion | |
| | Start data transfer |
| Process command and data from agent Send return code to agent if necessary | |
| | Send Report file Send EOJ command |
| Send acknowledgement to agent Close connection | |

After getting the session header from all the SOURCES, PARALLEL will write a session header to tape for each session. All session headers are followed by a filemark except the last one. The session header has the information on how to skip all the season headers.

The command or data from the agents includes:
A. Tape Operation
B. ASDB command
C. Session header
D. File Data: Header, trailer, raw data.
   If PARALLEL detects that the file is a session trailer, it will write the trailer to tape as a file with a special file signature.
E. Log Message
F. Report File message
G. Get Permanent Tape command PARALLEL will send the information to the agent.

After receiving EOJ from all agents, PARALLEL will write Session Trailer and Filemark to tape.

Figure 6:
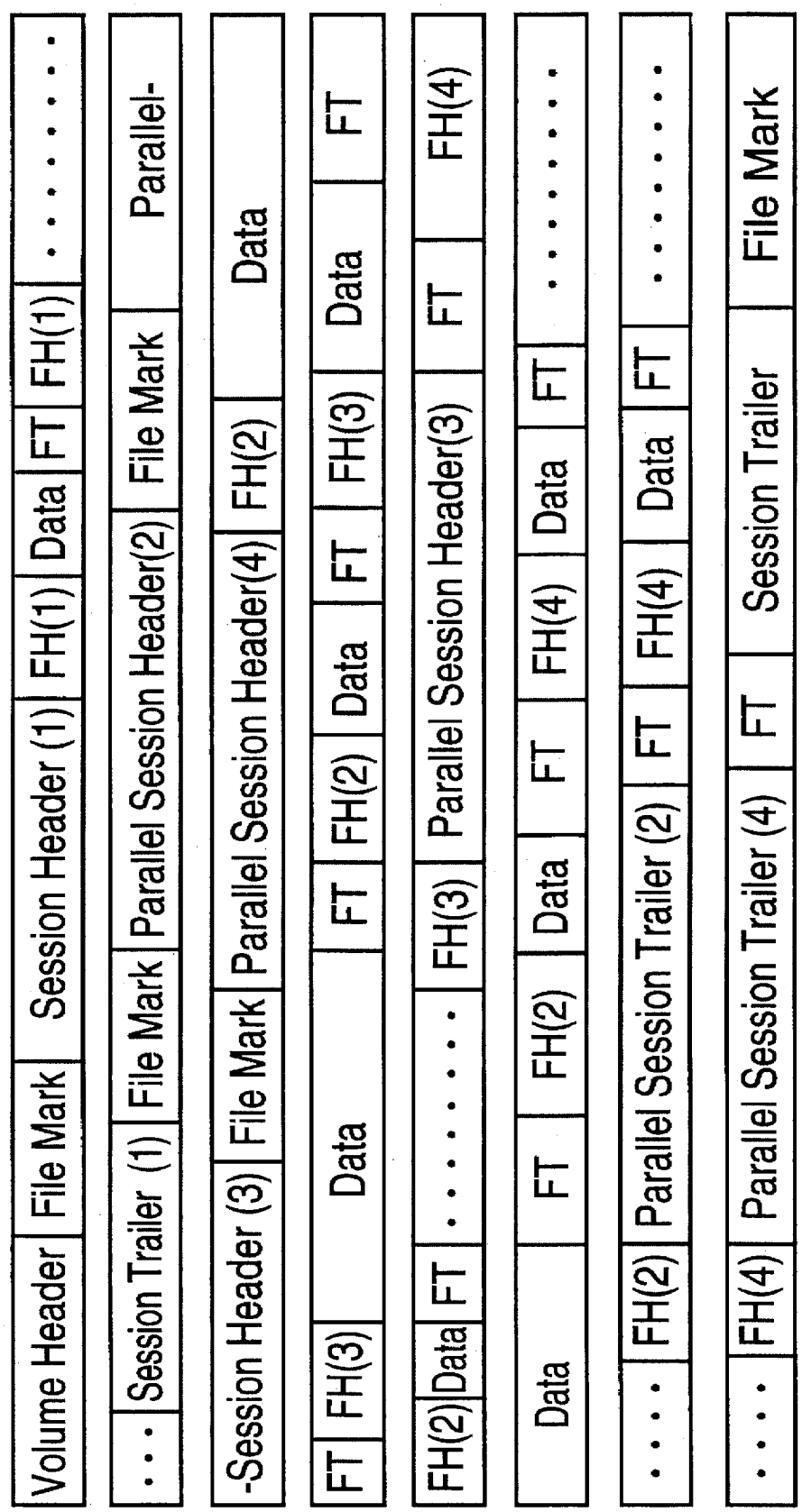
FIG. 6 is an example tape segment showing header information.

FIG. 6 is an example tape layout for both a series mode back-up and a parallel mode back-up. Session 1 is a series mode back-up. Sessions 2, 3, and 4 are created by parallel back-up. The job has two SOURCES and the second SOURCE has two volumes. "FH" means file header, "FT" means file trailer and "(n)" is the session number. The parallel season header contains information about the total number of sessions in parallel back-up and the number of headers to skip to find the first file header. Parallel session trailer is the session trailer of one session in parallel back-up.

What is claimed is:

1. A system for parallel back-up of a plurality of client computers on a local area network, each client computer including a local storage device storing files, the system comprising:
   a server computer coupled to the local area network for executing a back-up job, the server computer including a plurality of buffer segments, the server computer further including:
   (i) means for accepting parameters for the back-up job, the parameters including a source parameter specifying a set of the client computers,
   (ii) means for associating a buffer segment with each client computer in the set of client computers specified in the source parameter,
   (iii) means for receiving files in parallel at each allocated buffer segment from each associated client computer,
   (iv) means for sequentially accessing each allocated buffer segment,
   (v) means for determining when a buffer segment includes a complete file, and
   (vi) means for reading a file from a buffer segment; and
   a plurality of back-up storage devices coupled to the server computer by a bus,
   wherein, upon reading a file from a buffer segment, the server computer causes the file to be stored on one of the plurality of back-up storage devices.

2. The system of claim 1 wherein the plurality of back-up storage devices are organized as a plurality of groups, each one of the plurality of back-up storage devices being a member of one group.

3. The system of claim 2 wherein one back-up storage device in each group operates in parallel with one back-up storage device from at least one other group.

4. The system of claim 3 wherein the server computer further comprises:
   means for reading, in parallel, a file from each buffer segment that includes a complete file; and
   means for writing, in parallel, said read files each to one back-up storage device.

5. The system of claim 2 wherein the parameters for the back-up job includes a destination parameter specifying one of the plurality of groups.

6. The system of claim 5 wherein the server computer further comprises means for causing a file to be stored on a first back-up storage device, said first back-up storage device being a member of the one of the plurality of groups specified in the destination parameter.

7. The system of claim 6 wherein the server computer further comprises means for causing a file to be stored on a second back-up storage device when said first back-up storage device is full, said second back-up storage device being a member of the one of the plurality of groups specified in the destination parameter.

8. The system of claim 1 wherein the parameters for the back-up job includes a destination parameter specifying one of the plurality of back-up storage devices.

9. The system of claim 8 wherein the server computer further comprises means for causing a file to be stored the one of the plurality of back-up storage devices specified in the destination parameter.

10. The system of claim 1 wherein each client computer includes a network agent executable by the client computer for transmitting files to the buffer segment allocated to said client computer, and wherein the server computer further comprises means for causing the client computers in the sets of client computers specified in the source parameters to execute the respective network agents of the client computers in parallel.

11. The system of claim 1 wherein the bus operates according to a SCSI protocol.

12. The system of claim 1 wherein the plurality of back-up storage devices are tape drives.

13. The system of claim 1 wherein at least one of the plurality of back-up storage devices is a tape drive.

14. The system of claim 1 wherein the local area network includes a wide area network.

15. The system of claim 1 wherein the plurality of client computers include workstations.

16. The system of claim 1 wherein the plurality of client computers include file servers.

17. The system of claim 1 wherein said plurality of buffer segments are allocated based on an average size of said files.

18. A system for parallel back-up of a plurality of client computers on a local area network, each client computer including a local storage device storing files, the system comprising:
   a plurality of back-up storage devices, the plurality of back-up storage devices organized as a plurality of groups, each one of the plurality of back-up storage devices being a member of one group, one back-up storage device from each group capable of operating in parallel with back-up storage devices from other groups; and
   a server computer coupled to the plurality of back-up storage devices by a bus and coupled to the local area network, the server computer for executing a plurality of back-up jobs in parallel, the server computer further including:
   (I) means for accepting parameters for each back-up job, the parameters including for each back-up job a source parameter specifying a set of the client computers and a destination parameter specifying a select group,
   (ii) means for receiving, in parallel, a complete file from one of the set of client computers specified in the source parameter for each back-up job, and
   (iii) means for causing, in parallel, each received complete file to be stored on a file basis on a back-up storage device being a member of the select group specified in the destination parameter.

19. The system of claim 18 wherein each client computer includes a network agent executable by the client computer for transmitting files to the server computer.

20. The system of claim 19 wherein the server computer further comprises means for causing each client computer in the set of client computers specified in the source parameter to execute the network agent of the client computer in parallel.

21. The system of claim 18 wherein the local area network includes a wide area network.

22. A system for parallel back-up of a plurality of client computers on a local area network, each client computer including a local storage device storing files, the system comprising:
   a plurality of back-up storage devices, the plurality of back-up storage devices organized as a plurality of groups, each one of the plurality of back-up storage devices being a member of one group; and
   a server computer coupled to the plurality of back-up storage devices by a bus and coupled to the local area network, the server computer for executing a back-up job, the server computer further including:

(I) means for accepting parameters for the back-up job, the parameters including for each back-up job a source parameter specifying a set of the client computers and a destination parameter specifying a select group, (ii) means for receiving a file at a time complete files from each one of the set of client computers specified in the source parameter, and (iii) means for causing each received complete file to be stored on a file basis on one of the plurality of back-up storage devices being a member of the select group specified in the destination parameter.

23. The system of claim 22 wherein the server computer further comprises means for causing a complete file to be stored on a first back-up storage device, said first back-up storage device being a member of the group specified in the destination parameter.

24. The system of claim 23 wherein the server computer further comprises means for causing a file to be stored on a second back-up storage device when said first back-up storage device is full, said second back-up storage device being a member of the group specified in the destination parameter.

25. The system of claim 22 wherein each client computer includes a network agent executable by the client computer to cause transmission of files to the server computer.

26. The system of claim 25 wherein the server computer further comprises means for causing each client computer in the set of client computers specified in the source parameter to execute the network agent of the client computer.

27. The system of claim 25 wherein the server computer further comprises means for causing client computers in the set of client computers specified in the source parameters to execute the respective network agents of the client computers in parallel.

28. The system of claim 22 wherein the plurality of back-up storage devices are tape drives.

29. The system of claim 22 wherein the local area network includes a wide area network.

30. A system for parallel back-up of a plurality of client computers on a network, each client computer including a local storage device storing files, the system comprising:

a plurality of back-up storage devices, the plurality of back-up storage devices organized as a plurality of groups, each one of the plurality of back-up storage devices being a member of one group; and a server computer coupled to the plurality of back-up storage devices by a bus and coupled to the network, the server computer for executing a back-up job, the server computer accepting parameters for the back-up job, the parameters including a source parameter specifying a set of the client computers and a destination parameter specifying one of the plurality of groups, the server computer receiving complete files from each one of the set of client computers specified in the source parameter, and causing each received complete file to be stored on a file basis on a first one of the plurality of back-up storage devices being a member of the group specified in the destination parameter, and when the first one of the plurality of back-up storage devices fills, causing each remaining received complete file to be stored on a second one of the plurality of back-up storage devices being a member of the group specified in the destination parameter.

31. The system of claim 30 wherein the network includes a wide area network.

32. A system to enable parallel back-up of computers on a local area network, the system comprising:

a plurality of client computers coupled together on the local area network, each client computer including a local storage device and a network agent executable by the client computer;

a server computer coupled to the plurality of client computers via the local area network, the server computer for executing back-up jobs, the server computer including a plurality of buffer segments and a parallel processing module executable by the server computer; and a plurality of back-up storage devices coupled to the server computer by a bus, each of the back-up storage devices logically arranged as one of a plurality of groups;

wherein each back-up job identifies a set of the plurality of client computers as a source for back-up and a select group of back-up storage devices as a corresponding destination, the computer server, upon executing each back-up job allocates a buffer segment to each back-up job being executed and causes the client computers identified the source for back-up to execute the network agent of the client computer, each network agent causing files of data to placed in the buffer segment allocated to the back-up job, the parallel processing module sequentially accessing each buffer segment and transferring a file of data at a time to the one of the plurality of groups of back-up storage devices identified as the corresponding destination.

33. The system of claim 32 wherein one back-up storage device from each of the plurality of back-up storage devices receives data in parallel with data of other back-up jobs transmitted to back-up storage devices of other groups, and wherein the parallel processing module transfers files in parallel to the back-up storage devices.

34. The system of claim 32 wherein the files transferred to the one of the plurality of groups of back-up storage devices identified as the destination are stored on a first back-up storage device of the group, and wherein, when the first back-up storage device is full, the files transferred to the one of the plurality of groups of back-up storage devices identified as the destination are stored on a second back-up storage device of the group.

35. The system of claim 32 wherein the local area network includes a wide area network.

36. The system of claim 32 wherein the plurality of client computers are workstations.

37. The system of claim 32 wherein the plurality of client computers are file servers.

38. The system of claim 32 wherein the plurality of storage devices are tape drives.

39. A method to back-up a local area network comprising a plurality of client computers, each client computer including a local storage device storing files, the local area network including a server computer having a plurality of buffer segments, the server computer coupled to a plurality of back-up storage devices, the method comprising the steps of:

(a) accepting a back-up job request, the back-up job request including a source parameter specifying a set of client computers;

(b) associating a buffer segment with each client computer in the set of client computers specified in the source parameter;

(c) continuously receiving at each buffer segment, in parallel, a file from the client computer in the set of client computers associated with the buffer segment;

(d) selecting a buffer segment;

(e) when the selected buffer segment has received a complete file, transferring said file to a first one of the plurality of back-up storage devices;

(f) selecting a next buffer segment;

(g) repeating steps (e) and (f) until all files to be backed-up are transferred to the first one of the plurality of back-up storage devices.

40. A method to back-up a local area network comprising a plurality of client computers, each client computer including an executable agent and a local storage device storing files, the local area network including a server computer having a plurality of buffer segments, the server computer coupled to a plurality of back-up storage devices, the method comprising the steps of:

(a) accepting a back-up job request, the back-up job request including a source parameter specifying a set of client computers;

(b) associating a buffer segment with each client computer in the set of client computers specified in the source parameter;

(c) activating, in parallel, the executable agent at each client computer in the set of client computers specified in the source parameter, each executable agent transferring the files from the local storage device of the client computer to the buffer segment associated with the client computer;

(d) selecting a buffer segment;

(e) when the selected buffer segment has received a complete file, transferring said file to a first one of the plurality of back-up storage devices;

(f) selecting a next buffer segment;

(g) repeating steps (e) and (f) until all files transferred to buffer segments by the executable agents have been transferred to the first one of the plurality of back-up storage devices.

41. A method to back-up a local area network comprising a plurality of client computers, each client computer including a local storage device storing files, the local area network including a server computer having a plurality of buffer segments, the server computer coupled to a plurality of back-up storage devices arranged in a plurality of groups, each back-up storage device being a member of one group, the method comprising the steps of:

(a) accepting a back-up job request, the back-up job request including a source parameter specifying a set of client computers and a destination parameter specifying a group;

(b) associating a buffer segment with each client computer in the set of client computers specified in the source parameter;

(c) continuously receiving at each buffer segment, in parallel, a file from the client computer in the set of client computers associated with the buffer segment;

(d) selecting a buffer segment;

(e) when the selected buffer segment has received a complete file, transferring said file to a first one of the plurality of back-up storage devices of the group;

(f) selecting a next buffer segment;

(g) repeating steps (e) and (f) until all files to be backed-up are transferred to the first one of the plurality of back-up storage devices of the group.

42. The method of claim 41 further comprising the step of transferring each file to a second one of the plurality of back-up storage devices of the group when the first one of the back-up storage devices of the group is unavailable to store files.

43. A system to archive files stored on a plurality of client computers in a network in parallel, each client computer including a local storage device storing the files, the system comprising:

a server computer coupled to the network for executing an archive job, the server computer including a plurality of buffer segments, the server computer further including:

(i) means for accepting parameters for the archive job, the parameters including a source parameter specifying a set of the client computers, (ii) means for associating a buffer segment with each client computer in the set of client computers specified in the source parameter, (iii) means for receiving files in parallel at each allocated buffer segment from each associated client computer, (iv) means for sequentially accessing each allocated buffer segment, (v) means for determining when a buffer segment includes a complete file, and (vi) means for reading a file from a buffer segment; and a plurality of archive storage devices coupled to the server computer by a bus, wherein, upon reading a file from a buffer segment, the server computer causes the file to be archived on one of the plurality of archive storage devices.

44. The system of claim 43 wherein the plurality of archive storage devices are organized as a plurality of groups, each one of the plurality of archive storage devices being a member of one group.

45. The system of claim 44 wherein one archive storage device in each group operates in parallel with one archive storage device from at least one other group.

46. The system of claim 45 wherein the server computer further comprises:

means for reading, in parallel, a file from each buffer segment that includes a complete file; and means for writing, in parallel, said read files each to one archive storage device.

47. The system of claim 44 wherein the parameters for the archive job includes a destination parameter specifying one of the plurality of groups.

48. The system of claim 47 wherein the server computer further comprises means for causing a file to be stored on a first archive storage device, said first archive storage device being a member of the one of the plurality of groups specified in the destination parameter.

49. The system of claim 48 wherein the server computer further comprises means for causing a file to be stored on a second archive storage device when said first archive storage device is full, said second archive storage device being a member of the one of the plurality of groups specified in the destination parameter.

50. The system of claim 43 wherein the parameters for the archive job includes a destination parameter specifying one of the plurality of archive storage devices.

51. The system of claim 50 wherein the server computer further comprises means for causing a file to be stored the one of the plurality of archive storage devices specified in the destination parameter.

52. The system of claim 43 wherein each client computer includes a network agent executable by the client computer for transmitting files to the buffer segment allocated to said client computer, and wherein the server computer further comprises means for causing the client computers in the sets of client computers specified in the source parameters to execute the respective network agents of the client computers in parallel.

53. The system of claim 43 wherein the plurality of archive storage devices are tape drives.

54. The system of claim 43 wherein at least one of the plurality of archive storage devices is a tape drive.

55. The system of claim 43 wherein the network includes a wide area network.

56. The system of claim 43 wherein the network includes a local area network.

57. The system of claim 43 wherein the network includes an enterprise-wide network.

58. A system to transfer files stored on a plurality of client computers in a network in parallel, each client computer including a local storage device storing the files, the system comprising:
- a server computer coupled to the network for executing a transfer job, the server computer including a plurality of buffer segments, the server computer further including:
    - (i) means for accepting parameters for the transfer job, the parameters including a source parameter specifying a set of the client computers,
    - (ii) means for associating a buffer segment with each client computer in the set of client computers specified in the source parameter,
    - (iii) means for receiving files in parallel at each allocated buffer segment from each associated client computer,
    - (iv) means for sequentially accessing each allocated buffer segment,
    - (v) means for determining when a buffer segment includes a complete file, and
    - (vi) means for reading a file from a buffer segment; and
- a plurality of storage devices coupled to the server computer by a bus,
- wherein, upon reading a file from a buffer segment, the server computer causes the file to be transferred to one of the plurality of storage devices.

59. The system of claim 58 wherein at least one of the plurality of storage devices is a tape drive.

60. The system of claim 58 wherein the network includes a wide area network.

61. The system of claim 58 wherein the network includes a local area network.

62. The system of claim 58 wherein the network includes an enterprise-wide network.

63. A system for transferring, in parallel, files stored on a plurality of client computers on a local area network, each client computer including a local storage device storing files, the system comprising:
- a plurality of storage devices, the plurality of storage devices organized as a plurality of groups, each one of the plurality of storage devices being a member of one group, one storage device from each group capable of operating in parallel with storage devices from other groups; and
- a server computer coupled to the plurality of storage devices by a bus and coupled to the local area network, the server computer for executing a plurality of transfer jobs in parallel, the server computer further including:
    - (I) means for accepting parameters for each transfer job, the parameters including for each transfer job a source parameter specifying a set of the client computers and a destination parameter specifying a select group,
    - (ii) means for receiving, in parallel, a complete file from one of the set of client computers specified in the source parameter for each transfer job, and
    - (iii) means for causing, in parallel, each received complete file to be stored on a file basis on a storage device being a member of the select group specified in the destination parameter.

64. The system of claim 63 wherein each client computer includes a network agent executable by the client computer for transmitting files to the server computer.

65. The system of claim 64 wherein the server computer further comprises means for causing each client computer in the set of client computers specified in the source parameter to execute the network agent of the client computer in parallel.

66. The system of claim 64 wherein the plurality of storage devices are tape drives.

67. The system of claim 63 wherein the local area network includes a wide area network.

68. A system for transferring, in parallel, a plurality files stored on a plurality of client computers on a network, each client computer including a local storage device storing files, the system comprising:
- a plurality of storage devices, the plurality of storage devices organized as a plurality of groups, each one of the plurality of storage devices being a member of one group; and
- a server computer coupled to the plurality of storage devices by a bus and coupled to the network, the server computer for executing a transfer job, the server computer accepting parameters for the transfer job, the parameters including a source parameter specifying a set of the client computers and a destination parameter specifying one of the plurality of groups, the server computer receiving complete files from each one of the set of client computers specified in the source parameter, and causing each received complete file to be stored on a file basis on a first one of the plurality of storage devices being a member of the group specified in the destination parameter, and when the first one of the plurality of storage devices fills, causing each remaining complete received file to be stored on a second one of the plurality of storage devices being a member of the group specified in the destination parameter.

69. The system of claim 68 wherein the transfer job includes an archive job.

70. The system of claim 68 wherein the plurality of client computers are workstations.

71. The system of claim 68 wherein the plurality of client computers include file servers.

72. The system of claim 68 wherein the plurality of storage devices are tape drives.

73. The system of claim 68 wherein the network includes a wide area network.

74. The system of claim 68 wherein the network includes a local area network.

75. The method of claim 68 wherein the network includes an enterprise network.

76. A method to archive data on a local area network by transferring the data from the local area network to storage devices and deleting the data from the local area network, the local area network comprising a plurality of client computers, each client computer including a local storage device storing files, the local area network including a server computer having a plurality of buffer segments, the server computer coupled to a plurality of storage devices, the method comprising the steps of:

(a) accepting an archive job request, the archive job request including a source parameter specifying a set of client computers;

(b) associating a buffer segment with each client computer in the set of client computers specified in the source parameter;

(c) continuously receiving at each buffer segment, in parallel, a file from the client computer in the set of client computers associated with the buffer segment;

(d) selecting a buffer segment;

(e) when the selected buffer segment has received a complete file, transferring said file to a first one of the plurality of storage devices;

(f) selecting a next buffer segment;

(g) repeating steps (e) and (f) until all files to be archived are transferred to the first one of the plurality of storage devices.

77. The method of claim 76 further comprising the step of deleting each archived file from each local storage device.

78. A method to transfer data stored on a network comprising a plurality of client computers, each client computer including an executable agent and a local storage device storing files, the network including a server computer having a plurality of buffer segments, the server computer coupled to a plurality of central storage devices, the method comprising the steps of:

(a) accepting a job request, the job request including a source parameter specifying a set of client computers;

(b) associating a buffer segment with each client computer in the set of client computers specified in the source parameter;

(c) activating, in parallel, the executable agent at each client computer in the set of client computers specified in the source parameter, each executable agent transferring the files from the local storage device of the client computer to the buffer segment associated with the client computer;

(d) selecting a buffer segment;

(e) when the selected buffer segment has received a complete file, transferring said file to a first one of the plurality of central storage devices for storage on a file basis;

(f) selecting a next buffer segment;

(g) repeating steps (e) and (f) until all files transferred to buffer segments by the executable agents have been transferred to the first one of the plurality of central storage devices.

79. A method to transfer files stored on a local area network comprising a plurality of client computers, each client computer including a local storage device storing files, the local area network including a server computer having a plurality of buffer segments, the server computer coupled to a plurality of storage devices arranged in a plurality of groups, each storage device being a member of one group, the method comprising the steps of:

(a) accepting a job request, the job request including a source parameter specifying a set of client computers and a destination parameter specifying a group;

(b) associating a buffer segment with each client computer in the set of client computers specified in the source parameter;

(c) continuously receiving at each buffer segment, in parallel, a file from the client computer in the set of client computers associated with the buffer segment;

(d) selecting a buffer segment;

(e) when the selected buffer segment has received a complete file, transferring said file to a first one of the plurality of storage devices of the group;

(f) selecting a next buffer segment;

(g) repeating steps (e) and (f) until all files to be transferred are transferred to the first one of the plurality of storage devices of the group.

80. The method of claim 79 further comprising the step of transferring each file to a second one of the plurality of storage devices of the group when the first one of the storage devices of the group is unavailable to store files.

81. A method to back-up a local area network comprising a plurality of client computers, each client computer including a local storage device storing files, the local area network including a server computer having a plurality of buffer segments, the server computer coupled to a plurality of back-up storage devices, the method comprising the steps of:

(a) accepting a back-up job request, the back-up job request including a source parameter specifying a set of client computers;

(b) associating a buffer segment with each client computer in the set of client computers specified in the source parameter;

(c) continuously receiving at each buffer segment, in parallel, a file from the client computer in the set of client computers associated with the buffer segment;

(d) selecting a buffer segment;

(e) if the selected buffer segment has received a complete file, transferring said file to a first one of the plurality of back-up storage devices;

(f) if the selected buffer segment is full but has not received a complete file, transferring the contents of the buffer to a first one of the plurality of back-up storage devices and then returning to step (e);

(g) selecting a next buffer segment;

(h) repeating steps (e), (f) and (g) until all files to be backed-up are transferred to the first one of the plurality of back-up storage devices.

\* \* \* \* \*